No. 636,761. Patented Nov. 14, 1899.
A. H. COBB.
HOOK AND EYE FASTENING.
(Application filed Mar. 13, 1899.)
(No Model.)
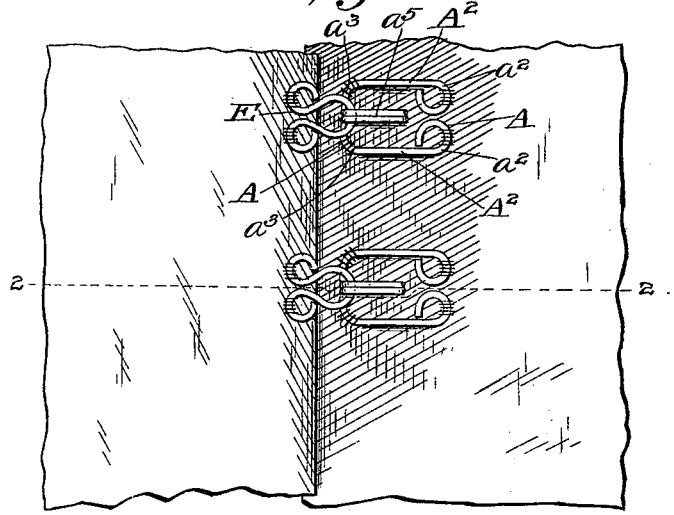
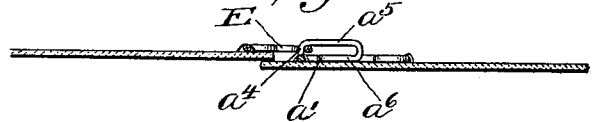
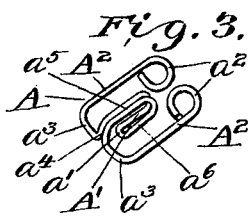
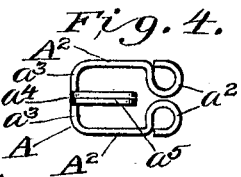
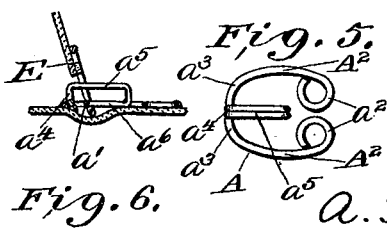
Witnesses
Jos. H. Blackwood
John Chalmers Thlroy
Inventor
A. H. Cobb
by Wilkinson & Fisher
Attorneys

UNITED STATES PATENT OFFICE.

ALPHONSO H. COBB, OF ASHEVILLE, NORTH CAROLINA.

HOOK-AND-EYE FASTENING.

SPECIFICATION forming part of Letters Patent No. 636,761, dated November 14, 1899.

Application filed March 13, 1899. Serial No. 708,903. (No model.)

*To all whom it may concern:*

Be it known that I, ALPHONSO H. COBB, lieutenant United States Navy, (retired,) residing at Asheville, in the county of Buncombe and State of North Carolina, have invented certain new and useful Improvements in Hook-and-Eye Fastenings; and I do hereby declare the following to be a full, clear, and exact description of the invention, such as will enable others skilled in the art to which it appertains to make and use the same.

My invention relates to garment-fasteners of the type known as "hook-and-eye," and more particularly to the construction of a hook adapted for engagement with an eye of the ordinary form, the object being to provide a comparatively flat non-catching hook projecting but slightly from the plane of its shank, and hence but slightly from the surface of the material of which the garment is made; to provide such means for holding the eye in engagement with the hook as will prevent accidental dislodgement of the eye therefrom, yet allowing of disengagement with ease by manual manipulation when desired, and to obviate the common requirement of resilience in any portion of the hook.

My invention consists in the novel form of hook hereinafter described and claimed.

Referring to the accompanying drawings, wherein the same parts are indicated by the same letters throughout the several views, Figure 1 represents a plan view of my invention as applied to a garment, and Fig. 2 represents a sectional view taken on the line 2 2 in Fig. 1 and looking in the direction of the arrows. Fig. 3 represents a perspective view of the hook detached. Fig. 4 represents a plan view of a slightly-modified form of hook, and Fig. 5 represents still another modification of the hook. Fig. 6 represents diagrammatically the manner in which the eye is moved into and out of engagement with the hook, displacing the material of the garment; and Fig. 7 represents a slight modification of the hook.

The hook A is preferably formed of a single continuous piece of stiff wire, and as it in no sense depends for its operation upon any "spring" action the metal used may be non-resilient. The shank of the hook is composed of a pair of members $A^2 A^2$, having at their rear ends eyelets or loops $a^2 a^2$ for the passage of thread to assist in securing the hook to the cloth of the garment, it being necessary to secure the opposite ends or loops of the shank to firmly unite hook to cloth. These members, comprising the shank of the hook, may be straight, as shown in Figs. 3 and 4, or curved, as shown in Fig. 5, and the loops $a^2 a^2$ may be formed by turning the ends of the wire inward, as shown in Figs. 3 and 5, or by turning the said ends outward, as shown in Fig. 4; but, however the said members $A^2 A^2$ may be bent with respect to each other, they must both lie in the same horizontal plane—that is to say, in such a position as that both will lie flat upon the material of the garment when secured thereto, as seen in Fig. 2. The space between these members $A^2 A^2$ must be sufficient to allow the uninterrupted passage of the eye E into and out of engagement with the hook, as hereinafter described.

The bill $A'$ of the hook, which is shown as being formed by doubling the wire blank back upon itself from a central point $a'$, corresponding to the point of the hook, connects with the shank members $A^2 A^2$ by means of lateral extensions $a^3 a^3$ and comprises the following essential elements—viz., the short base $a^4$, which extends away from the upper side of the shank at approximately right angles, the body portion $a^5$, which extends backward in a plane which may be approximately parallel to the plane of the shank and a short distance thereabove, as shown in Fig. 2, or may be inclined backward at an angle thereto downward from the base $a^4$, and the retroverted portion $a^6$, turned back from the rear end of the body portion $a^5$ and lying in the same plane as the shank members $A^2 A^2$ and midway between them, the point $a'$ of this retroverted portion being at a distance from the base $a^4$ of the hook merely great enough to allow the passage of the eye E, manipulated as shown in Fig. 6.

In use the shank members $A^2 A^2$ are laid flat upon the cloth of the garment, as seen in Figs. 1 and 2, and are secured thereto by means of stitches passed through the loops $a^2$ $a^2$ and around the shank members, as shown. When so secured, the retroverted portion of the hook-bill will bear upon the material of the garment between the shank members, as seen in Fig. 2, thus rendering it necessary in order to pass the eye E into or out of engagement with the bill that the material shall be displaced. This will occur when desired, due to the flexibility of the material, although, as will be readily understood, this pressure of the material will serve to prevent the accidental dislodgment of the eye E from its position of engagement with the hook while the garment is being worn.

The necessary relative positions of the hook and eye during the operation of engagement or disengagement are illustrated in Fig. 6, from which it will be seen that to accomplish either the engagement or disengagement of the eye from the hook even by hand the former must be turned to such an angle with respect to the latter as it could not ordinarily assume by reason of the pull upon the parts of the garment, and, furthermore, should the eye be so turned it would be arrested by the pressure of the material of the garment upon the retroverted portion $a^6$ of the bill of the hook.

The eye E may be of the well-known form shown or of any other equally-suitable form, but, except in conjunction with the hereinbefore-described hook, forms no part of my invention.

The modification shown in Fig. 7 differs from the previous figures merely in that the shank members are brought together before reaching the base portion $a^4$ of the bill.

In every case the material of the garment must be displaced in order to allow the passage of the eye E into the hook.

Having thus described my invention, what I claim, and desire to secure by Letters Patent of the United States, is—

As an article of manufacture, a garment-fastening hook, consisting of a single piece of wire bent at its outer ends to form eyes for securing the hook to the garment, and having side members next said eyes extending forward and meeting to form a tongue, which tongue is bent upward and backward, then down and forward again, the end portion of the tongue being substantially in the plane of the side members, and terminating near the base of said tongue, the said hook being adapted to be secured to the garment at said eyes and near the base of the tongue, whereby the cloth composing said garment constitutes a guard for the bill of said hook, substantially as described.

In testimony whereof I affix my signature in presence of two witnesses.

ALPHONSO H. COBB.

Witnesses:
E. C. McDOWELL,
SUSAN C. DUKES.